May 13, 1969  M. O. GROAT  3,443,303
PROCESS AND APPARATUS FOR FORMING A BUILDING STRUCTURE
Filed Dec. 23, 1966  Sheet 1 of 3
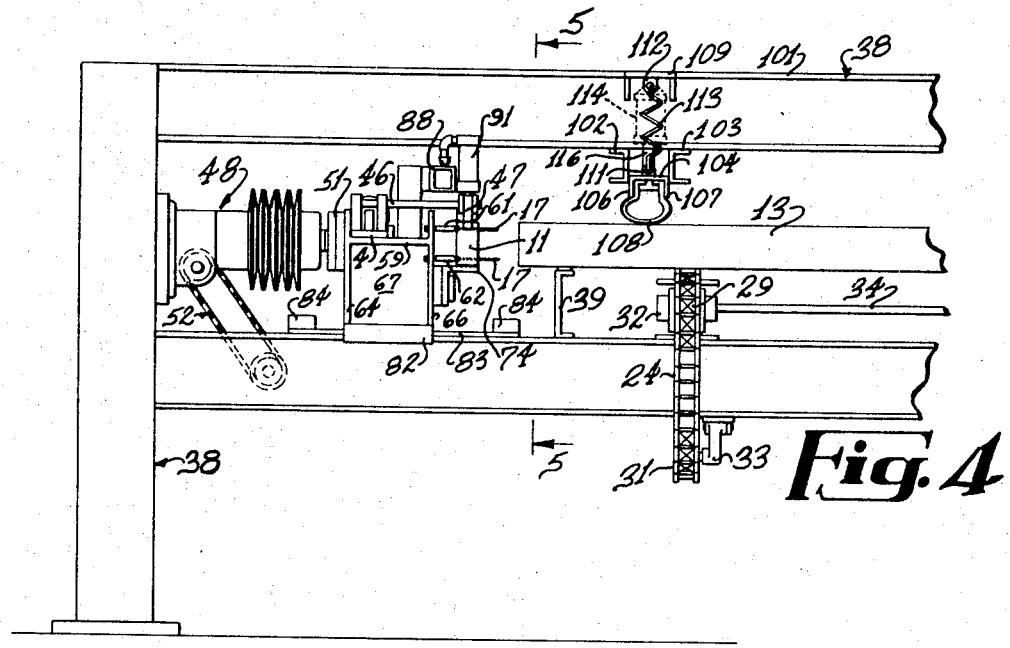
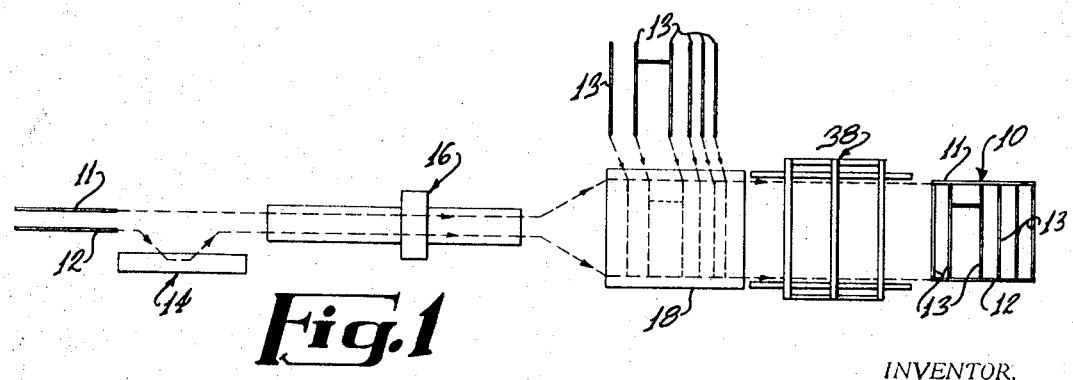
INVENTOR.
Marshall O. Groat
BY
Jennings, Carter & Thompson
Attorneys

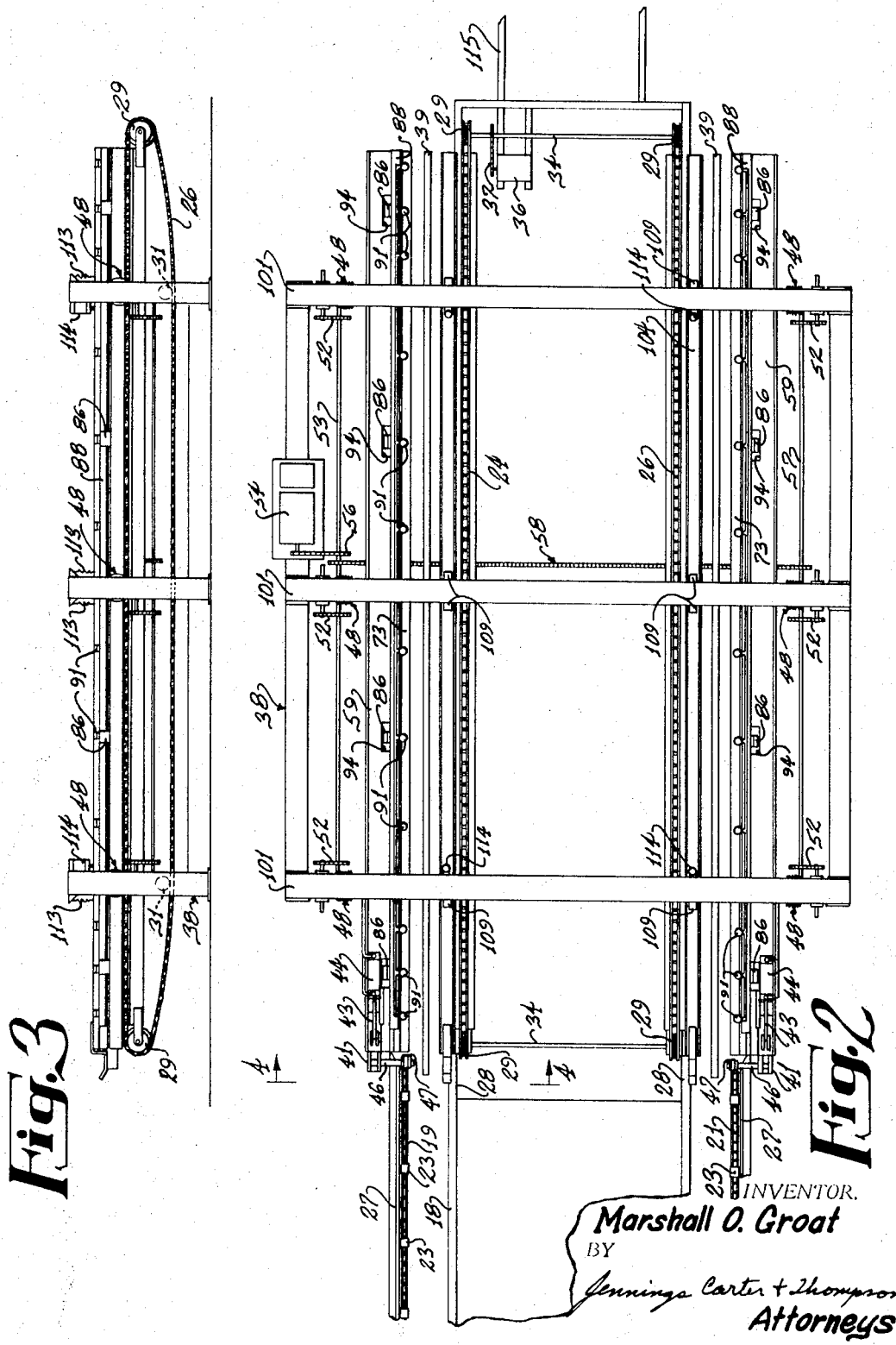

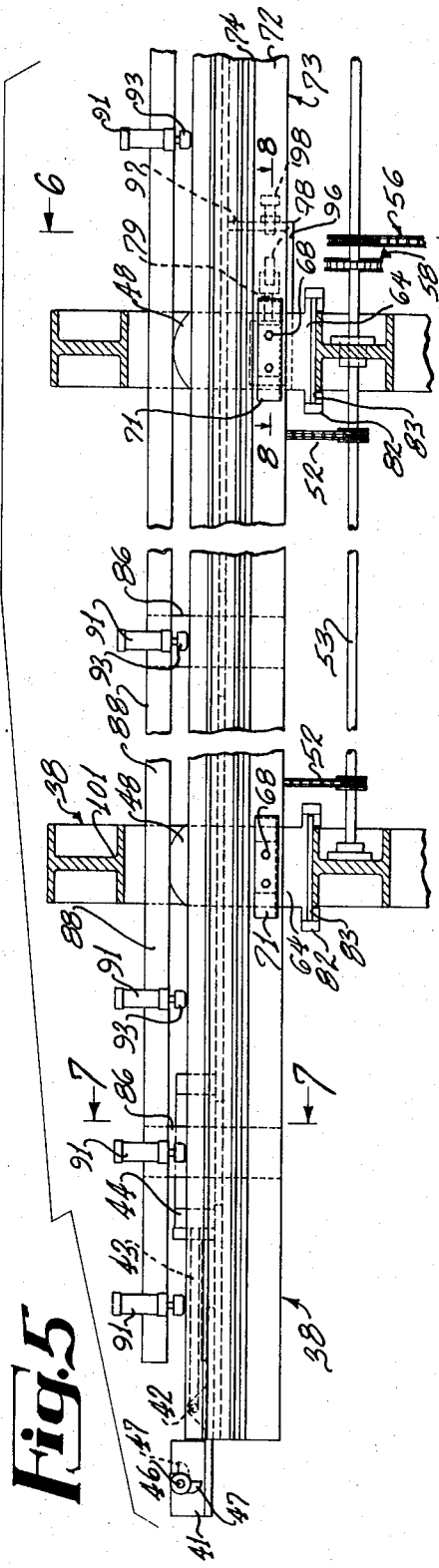

United States Patent Office 3,443,303
Patented May 13, 1969

3,443,303
PROCESS AND APPARATUS FOR FORMING
A BUILDING STRUCTURE
Marshall O. Groat, Fort Payne, Ala., assignor to Kingsberry Homes Corporation, a corporation of Delaware
Filed Dec. 23, 1966, Ser. No. 604,465
Int. Cl. B23q 3/00; B23p 19/00
U.S. Cl. 29—430                                                10 Claims

ABSTRACT OF THE DISCLOSURE

This invention relates to a process and apparatus for forming a building structure having elongated, spaced apart plate members secured to opposite ends of elongated, spaced apart transverse members positioned therebetween. Nail-like members are secured to the plate members at predetermined, longitudinally spaced locations with the ends of the nail-like members of one plate member projecting outwardly thereof and extending inwardly toward the other plate member. The plate members are positioned at opposite ends of the transverse members with the inwardly extending ends of the nail-like members extending alongside the transverse members in position to engage the transverse members. Means is provided to impart longitudinal movement to the plate members whereby the nail-like members carried thereby engage and move the transverse members into generally perpendicular alignment with the plate members. The transverse members are then retained in alignment with the plate members while the plate members are moved outwardly away from each other a distance at least as great as the distance the nail-like members project outwardly of the plate members. Longitudinal movement is then imparted again to the plate members a distance less than the thickness of the transverse members to thus place the inner ends of the nail-like members in position to enter the ends of the transverse members. Means is provided to then move the plate members inwardly toward each other to force the inwardly extending ends of the nail-like members into the ends of the transverse members and thus secure the plate members to the transverse members.

Heretofore in the art to which my invention relates, it has been the usual practice to arrange the plate members parallel to each other on a nailing floor and then arrange the transverse members, such as studs, therebetween in perpendicular alignment with each other. The plate members are then secured to the transverse members by hand nailing nails into the plate member and the transverse member. This procedure requires a substantial amount of hand labor and the transverse members are not always positioned accurately relative to the plate members. In accordance with my invention, the nail-like members are always positioned at predeermined locations and the transverse members are accurately aligned relatively to these predetermined locations whereby each nail enters the central portion of the transverse members.

Apparatus embodying features of my invention and which may be employed to carry out my improved process is shown in the accompanying drawings, forming a part of this application, in which:

FIG. 1 is a diagrammatic, top plan view showing the various steps of my improved process for forming the building structure;

FIG. 2 is a top plan view, partly broken away, showing a fragment of a layout table and a fragment of a support for the finished product, in combination with the remainder of my improved apparatus;

FIG. 3 is a side elevational view of the apparatus shown in FIG. 2, parts being omitted for the sake of clarity;

FIG. 4 is an enlarged, fragmental view taken generally along the line 4—4 of FIG. 2;

FIG. 5 is a sectional view taken generally along the line 5—5 of FIG. 4;

FIG. 6 is a fragmental, sectional view taken generally along the line 6—6 of FIG. 5;

FIG. 7 is a fragmental, sectional view taken generally along the line 7—7 of FIG. 5; and, FIG. 8 is a detailed, sectional view taken generally along line 8—8 of FIG. 5.

Referring now to the drawings for a better understanding of my invention, and more particularly to FIG. 1, I show a finished building structure generally at 10 which comprises a pair of spaced apart plate members 11 and 12 secured to opposite ends of elongated, spaced apart transverse member 13. In the drawings, I show the building structure as being a vertical wall or partition having a top plate member 11 and a bottom plate member 12 connected by vertical studs which extend transverse of the plate members. The plate members 11 and 12 first pass through an indexing station 14 where at least one of the plate members is indexed to determine the predetermined locations of the nail-like members to be applied. The plate members 11 and 12 then pass to a nail setter indicated generally at 16 which secures the nail-like members to the plate members at the predetermined, longitudinally spaced locations with the ends of the nail-like members of one plate member projecting outwardly thereof and extending inwardly toward the other plate member. The nail-like members are shown at 17 to FIG. 4.

From the nail-setter 16, the plate members 11 and 12 pass to a layout table 18 where a series of transverse members 13 are positioned therebetween. A transverse member 13 is positioned forwardly of each nail-like member 17 carried by the plate members 11 and 12 whereby the inwardly extending ends of the nail-like members 17 extend alongside the transverse members 13 in position to engage the transverse members 13 and move the same forward upon forward movement of the plate members 11 and 12, whereby the transverse members 13 are moved into generally perpendicular alignment with the plate members.

The plate members 11 and 12 are conveyed forwardly by chain conveyors 19 and 21 which are positioned at opposite sides of the layout table 18, as shown in FIG. 2. a plurality of longitudinally spaced support brackets 23 are carried by the conveyor chains 19 and 21 in position to engage and support the lower edge of the plate members. A vertically extending flange 27 is mounted in position to extend alongside the outer surface of each plate member 11 and 12 as the plate members are conveyed forwardly by the conveyor chains 19 and 21. As shown in FIG. 2, the layout table 18 is provided with forwardly extending support members 28 which support the transverse members 13 as they are conveyed onto conveyor chains 24 and 26.

As shown in FIGS. 2 and 4, the conveyor chains 24 and 26 pass around upper sprockets 29 and lower sprockets 31. The upper sprockets 29 are supported by suitable bearings 32 while the lower sprockets 31 are supported by suitable bearing brackets 33. Each pair of sprockets 29 at the ends of the conveyor chains 24 and 26 are connected by transverse shafts 34. The transverse shaft 34 at the forward end of the conveyor chains 24 and 26 is operatively connected to a motor 36 by a flexible drive indicated generally at 37. The bearings 32 and 33 are supported by a frame indicated generally at 38.

Mounted on the frame 38 at opposite sides of the conveyor chains 24 and 26 are longitudinally extending support members 39 which may be in the form of channel-like members. Mounted at each side of the frame 38 is a movable bracket 41 which is connected by a pivot pin 42 to a piston rod 43 of a fluid pressure operated cylinder 44. Secured to each bracket 41 and extending inwardly of the frame 38 is a support arm 46. Mounted for pivotal movement adjacent the inner end of each the arms 46 is a detent 47 which is adapted to pivot from the solid line position to the dotted line position shown in FIG. 5. A suitable stop is provided to limit pivotal movement of the detent 47 from the solid line position shown in FIG. 5 in a clockwise direction whereby upon forward movement of the bracket 41, the detent 47 is in position to engage the rear end of a plate member 11 or 12, as the case may be, to thus move the plate member forwardly a predetermined distance to align the rear ends of the plate members 11 and 12 with each other. Also, by aligning the rear ends of the plate members with each other, the nail-like member carried by the plate member 11 is moved into alignment with the nail-like members carried by the plate member 12, thus positioning the transverse members 13 in accurate, perpendicular alignment with the plate members.

A plurality of press units indicated generally at 48 are mounted at each side of the frame 38, as shown. Each press unit 48 comprises a jack-screw unit 49 having a movable element 51 which is adapted to move inwardly and outwardly of the frame 38 upon actuation of the jack-screw. Power is imparted to each jack-screw unit by a flexible drive indicated generally at 52. The flexible drives 52 at one side of the frame 38 are driven by a power shaft 53 which is operatively connected to a motor 54 by a flexible drive 56. The flexible drives 52 at the opposite side of the frame 38 are driven by a power shaft 57 which is operatively connected to the power shaft 53 by a flexible drive unit indicated generally at 58. The jack-screw units 49 are operatively connected to the motor 54 whereby upon rotation of the motor 54 in one direction, all of the movable elements 51 of the jack-screw units move inwardly of the frame 38 whereas rotation of the motor 54 in the opposite direction causes the movable elements at opposite sides of the frame 38 to move outwardly away from each other.

Elongated support members, such as I-beams 59 are carried by the movable elements 51 in position to move inwardly and outwardly in parallel relationship to each other. Elongated presser elements 61 and 62 are mounted along the inner surface of each of the elongated support members 59 in position to engage the nail-like elements 17 carried by the plate members 11 and 12, as shown in FIG. 4. The presser elements 61 and 62 are adjustably connected to the elongated members 59 by adjusting screws 63 so that the elongated presser elements 61 and 62 extend parallel to each other to thus impart a continuous and uniform force against the nail-like elements 17 carried by the plate members 11 and 12.

Secured to the under surface of the elongated support members 59 subjacent each of the jack-screw units 49 are depending brackets 64 and 66 which are secured to each other by a vertical plate 67. Secured to the depending bracket 64 by bolts 68 are spaced apart plate-like members 69 and 71. Mounted for sliding movement between the plate-like members 69 and 71 is the vertical flange 72 of an angle member 73 having a horizontal flange 74. An elongated slot 76 is provided in the vertical flange 72 for receiving a spacer member 77 which is mounted between and secured rigidly to bracket 64 and the plate-like members 69 and 71, as shown in FIG. 8. Secured to the inner surface of the vertical flange 72 of the angle member 73 at each side of the frame 38 is a bracket 78 which is operatively connected to the piston rod 79 of a fluid pressure operated cylinder 81 which is mounted on the vertical plate 67. Accordingly, upon actuation of the cylinder 81, the bracket 78 and the angle member 73 connected thereto moves relative to the elongated support member 59. The lower ends of each pair of depending members 64 and 66 are secured to a bracket 82 which is adapted for sliding movement relative to a bearing plate 83 carried by the frame 38. Suitable stop members 84 are mounted in position to limit longitudinal movement of the bracket 82 relative to the bearing member 83.

The upper surface of the horizontal flange 74 of the angle member 73 is adapted to support the plate members 11 and 12 as they are moved into the frame by the conveyor chains 19 and 21 and the detents 47. Secured to the vertical flange 72 of the angle bracket 73 at opposite sides of the frame 38 by spacers 85 are vertical support member 86 which are spaced longitudinally from each other, as shown in FIG. 2. Secured to the upper ends of the support members 86 by suitable spacer elements 87 are longitudinally extending members 88 which carry a plurality of longitudinally spaced plate clamping units 89. Each clamping unit 89 comprises a fluid pressure operated cylinder 91 having a piston rod 92. A resilient clamping element 93 is carried at the lower end of each piston rod 92 in position to engage the upper surface of a plate member 11 or 12, as the case may be, to thus secure the plate in place after the plate members 11 and 12 have been moved forward by the detents 47. Suitable openings 94 are provided in the webs of the elongated members 59 for receiving the upstanding support members 86, as shown in FIG. 7.

To limit longitudinal movement of the angle member 73 and the plate member 11 or 12, as the case may be, clamped therebetween, I secure a support bracket 96 to the depending members 64 and 66 located adjacent the brackets 78, as shown in FIGS. 6 and 8. The support bracket 96 is provided with an upstanding flange 97. A suitable threaded opening is provided in the flange 97 for receiving an adjusting screw 98 which is locked in selected positions by a lock nut 99. The inner end of the adjusting screw 98 is in position to engage the members 78 to thus limit movement of the angle 73.

To clamp the transverse members 13 in place after they have been moved into proper alignment with the plate member 11 and 12 by the detents 47, I mount transverse member 101 at longitudinally spaced intervals along the frame 38, as shown in FIG. 2. Secured to the under surface of the transverse members 101 and extending generally parallel to the angles 73 are channel members 102 and 103 having their flanges extending outwardly away from each other, as shown in FIG. 4. Mounted for vertical movement between the webs of the channel-like members 102 and 103 is a channel-like member 104 having depending flanges 106 and 107. Secured to the inner surface of the channel-like member 104 between the flanges 106 and 107 is an elongated, resilient clamp member 108 which is in position to engage the upper surface of a subjacent transverse member 13, as clearly shown in FIG. 4.

Channel-like brackets 109 are secured to the transverse members 101 above the channel members 104, as shown in FIGS. 2 and 4. Secured to the upper surface of the channel member 104 and the under surface of the channel bracket 109 by suitable securing brackets 111 and 112, respectively, are tension springs 113. The tension springs 113 are adapted to urge the elongated clamping elements 108 away from the transverse members 13.

Secured to the channel brackets 109 adjacent the forward and rear ends of the frame 38 are depending, fluid pressure operated cylinders 114 having piston rods 116 connected to the upper portion of a subjacent channel member 104, as shown in FIG. 4. The fluid pressure operated cylinder 114 is actuated after the transverse members 13 have been moved into perpendicular alignment with the plate members 11 and 12 by the detents 47.

From the foregoing description, the operation of my improved apparatus and the manner in which my improved process is carried out will be readily understood. The plate members 11 and 12 are delivered to the index station 14 whereupon at least one of the plate members is indexed to indicate the position that a nail-like member is to be applied. The plate members 11 and 12 are then delivered to the nail setter 16 whereupon the nail-like members are driven into the plate members with the ends of the nail-like members 17 of one plate member projecting outwardly thereof and extending inwardly toward the other plate member. Transverse members 13, such as stud members or the like, are positioned on the layout table 18 and the plate members 11 and 12 are positioned at opposite ends of the transverse members with the inwardly extending ends of aligned pairs of the nail-like members 17 extending alongside and in position to engage the rear sides of the transverse members adjacent the ends thereof. Longitudinal movement is imparted to the plate members 11 and 12 by energizing the power means for the conveyor chains 19 and 21 whereby the nail-like members 17 carried by the plate members engage and move the transverse members into perpendicular alignment with the plate members as the plate members move inwardly of the frame 38 along the upper flanges 74 of the angle member 73.

As the plate members 11 and 12 move into engagement with the detents 47, the detents are pivoted from the solid line position to the dotted line position shown in FIG. 5 whereupon the detents 47 at opposite sides of the frame 38 ride over the tops of the plate members 11 and 12. The conveyor chains 19 and 21 convey the plate members 11 and 12 to a location just past the detents 47 whereupon the detents drop to the solid line position shown in FIG. 5. The fluid pressure operated cylinder 44 is then energized to move both brackets 41 forward a predetermined distance to thus accurately position the rear ends of the plate members 11 and 12 in transverse alignment with each other whereby the nail-like members carried by the plate member 11 are in transverse alignment with the nail-like members carried by the plate member 12. The alignment of transverse pairs of nail-like members 17 thus positions the transverse members 13 in perpendicular alignment with the plate members 11 and 12.

With the transverse members 13 moved into perpendicular alignment with the plate members 11 and 12, the fluid pressure operated cylinders 91 are energized to move the clamping elements 93 into engagement with the upper surfaces of the plate members 11 and 12 to thus secure the plate members between the clamping members 93 and the upper surface of flange 74. Also, while the transverse members 13 are in perpendicular alignment with the plate members 11 and 12, the fluid pressure operated cylinders 114 are energized to move the resilient clamping members 108 into clamping relation with the transverse members 13 to thus retain them in proper alignment with the plate members.

With the plate members 11 and 12 and the transverse members 13 in proper alignment with each other, the jack-screw units 48 at each side of the frame 38 are actuated to move the movable elements 51 thereof and the entire mechanism for clamping the plate members 11 and 12 outwardly away from each other a distance at least as great as the distance the nail-like members 17 project outwardly of the plate members. With the plate members 11 and 12 moved to a position for their nail-like members 17 to clear the ends of the transverse members 13, the fluid pressure operated cylinder 81 is energized to move the bracket 78 and the angle member 73 forward a distance approximately one-half the thickness of the transverse members 13, thus placing the inner ends of the nail-like members 17 in position to enter the ends of the transverse members 13. The jack-screw units 48 are then actuated to move the movable elements 51 and the presser elements 61 and 62 carried thereby inwardly toward each other to force the nail-like members 17 into the ends of the transverse members and thus secure the plate members 11 and 12 to the transverse members 13. With the transverse members thus secured to the plate members, the jack-screw units 48 are moved outwardly and the fluid pressure operated cylinders 91 are actuated to retract the clamping elements 93 whereby the plate members 11 and 12 are released. At the same time, the fluid pressure operated cylinders 114 are actuated to retract the elongated clamping members 108 whereby the transverse members 13 are released. The chain conveyors 19, 21, 24, and 26 are then actuated again to introduce another pair of plate members with transverse members therebetween into the frame 38, as described hereinabove, whereby the completed structure is discharged onto a suitable supporting frame indicated generally at 115.

From the foregoing, it will be seen that I have devised an improved process and apparatus for forming a building structure. By providing means for accurately positioning the ends of the plate members in transverse alignment with each other and at the same time positioning the transverse members in perpendicular alignment with the plate members, the components of the building structure are always accurately positioned relative to each other prior to securing the members in place. Also, by providing means for shifting the plate members longitudinally relative to the transverse members after the components are aligned in perpendicular relation to each other, the nail-like members are accurately positioned to enter the central portion of the transverse member as the presser elements are moved inwardly. Furthermore, by employing the nail-like elements as a means for aligning the transverse members relative to the plate members, I greatly simplify the mechanism for aligning the members relative to each other and at the same time reduce the amount of labor and time required to align the components relative to each other.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What is claimed is:

1. The process of forming a building structure having elongated, spaced apart plate members secured to opposite ends of elongated, spaced apart transverse members positioned therebetween which comprises the steps of:
   (a) securing nail-like members to said plate members at predetermined longitudinally spaced locations with the ends of the nail-like members of one plate member projecting outwardly thereof and extending inwardly toward the other plate member,
   (b) positioning said plate members at opposite ends of said transverse members with the inwardly extending ends of said nail-like members extending alongside said transverse members in position to engage said transverse members,
   (c) imparting relative movement between said plate members and said transverse members so that said nail-like members engage said transverse members and align said plate members and transverse members generally perpendicular to each other,
   (d) retaining said transverse members in generally perpendicular alignment with said plate members,
   (e) moving said plate members outwardly away from each other a distance for said nail-like members to clear the ends of said transverse members,
   (f) imparting relative movement again between said plate members and said transverse members to place said nail-like members in position to enter the ends of said transverse members, and
   (g) moving said plate members inwardly toward each other to force said inwardly extending ends of the nail-like members into the ends of said transverse members and thus secure said plate members to said transverse members.

2. In apparatus for forming a building structure having elongated, spaced apart plate members secured to opposite ends of elongated, spaced apart transverse members positioned therebetween, the improvement which comprises:
- (a) means for securing nail-like members to said plate members at predetermined longitudinally spaced locations with the ends of the nail-like members of one plate member projecting outwardly thereof and extending inwardly toward the other plate member,
- (b) means for positioning said plate members at opposite ends of said transverse members with the inwardly extending ends of said nail-like members extending alongside said transverse members in position to engage said transverse members,
- (c) means for imparting relative movement between said plate members and said transverse members so that said nail-like members engage said transverse members and align said plate members and transverse members generally perpendicular to each other,
- (d) means for retaining said transverse members in generally perpendicular alignment with said plate members,
- (e) means for removing said plate members outwardly away from each other a distance to clear the innermost ends of said nail-like members for movement past the ends of said transverse members,
- (f) means for imparting relative movement between said plate members and said transverse members to place the inner ends of said nail-like members in position to enter the ends of said transverse members, and
- (g) means for moving said plate members inwardly toward each other to force said inwardly extending ends of the nail-like members into the ends of said transverse members and thus secure said plate members to said transverse members.

3. Apparatus for forming a building structure as defined in claim 2 in which the means for positioning said plate members at opposite ends of said transverse members comprises:
- (a) a layout table disposed to support said transverse members in generally parallel spaced relation to each other,
- (b) conveyors at opposite sides of said layout table in position to support said plate members adjacent the ends of said transverse members and convey said plate members longitudinally so that the nail-like members carried by the plate members engage the sides of said transverse members adjacent the ends thereof to move said transverse members into generally perpendicular alignment with the plate members.

4. Apparatus for forming a building structure as defined in claim 3 in which another conveyor is mounted in position to receive the plate members and the transverse members moved thereby for removal of the plate members and transverse members after they are secured to each other.

5. Apparatus for forming a building structure as defined in claim 2 in which movable members are mounted in position to engage the ends of said plate members and move the same concomitantly a predetermined longitudinal distance to align the ends of said plate members with each other prior to movement of said plate members outwardly away from each other.

6. Apparatus for forming a building structure as defined in claim 5 in which each movable member comprises:
- (a) a movable bracket,
- (b) a detent operatively connected to said bracket and mounted for pivotal movement in position to be engaged by the forward end of a plate member as it moves therebeneath so that the detent pivots in one direction and rides over the plate member,
- (c) means limiting pivotal movement of said detent in the other direction so that it is disposed to engage the rear end of said plate member after said rear end passes beneath said detent, and
- (d) means moving said bracket and the detent carried thereby said predetermined distance.

7. Apparatus for forming a building structure as defined in claim 2 in which the means for retaining the transverse members in generally perpendicular alignment with the plate members comprises:
- (a) elongated clamping members extending across said transverse members, and
- (b) means for moving said elongated clamping members selectively toward and away from said transverse members so that said transverse members are clamped in place and released respectively.

8. Apparatus for forming a building structure as defined in claim 2 in which longitudinally extending clamping units are mounted in position to detachably engage said plate members to hold said plate members in alignment with the transverse members.

9. Apparatus for forming a building structure as defined in claim 8 in which a presser unit is operatively connected to each clamping unit to move said clamping unit and the plate member clamped therein selectively toward and away from the ends of said transverse members.

10. Apparatus for forming a building structure as defined in claim 8 in which means is operatively connected to said clamping unit to move each clamping unit and the plate members clamped therein a distance equal approximately one half the thickness of said transverse members while said clamping unit is moved outwardly away from said transverse members to place the nail-like members in position to enter the ends of said transverse members.

References Cited

UNITED STATES PATENTS

| | | |
|---|---|---|
| 2,567,586 | 9/1951 | Werder. |
| 2,574,163 | 11/1951 | Bamford _____ 29—430 X |
| 2,626,643 | 1/1953 | Kantzler. |
| 2,754,862 | 7/1956 | Kemp. |
| 2,822,841 | 2/1958 | Huffman. |
| 2,884,967 | 5/1959 | Le Vay. |
| 3,399,445 | 9/1968 | Carrol _____ 29—430 X |

CHARLIE T. MOON, Primary Examiner.

U.S. Cl. X.R.

29—432, 467, 469; 144—3, 288; 217—119; 227—44, 104